(12) United States Patent
Hawkins et al.

(10) Patent No.: US 9,900,767 B2
(45) Date of Patent: Feb. 20, 2018

(54) METHOD OF ESTABLISHING COMMUNICATIONS

(71) Applicant: Apple Inc., Cupertino, CA (US)

(72) Inventors: Tyler Hawkins, Sunnyvale, CA (US); Christopher Wilson, San Francisco, CA (US); Conrad Sauerwald, Mountain View, CA (US); Gregory Novick, San Francisco, CA (US); Neil G. Crane, San Francisco, CA (US); Rudolph Van Der Merwe, Portland, OR (US); Samuel Noble, Portland, OR (US); Paul William Chinn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/599,088

(22) Filed: May 18, 2017

(65) Prior Publication Data

US 2017/0257756 A1 Sep. 7, 2017

Related U.S. Application Data

(63) Continuation of application No. 14/474,716, filed on Sep. 2, 2014, now Pat. No. 9,661,495.

(51) Int. Cl.
*H04W 8/26* (2009.01)
*H04W 4/00* (2018.01)
(Continued)

(52) U.S. Cl.
CPC .......... *H04W 8/265* (2013.01); *G06K 7/1447* (2013.01); *H04W 4/008* (2013.01); *H04W 8/18* (2013.01); *H04W 12/04* (2013.01); *H04W 8/005* (2013.01)

(58) Field of Classification Search
CPC .... G06K 7/1447; H04W 12/04; H04W 4/008; H04W 8/005; H04W 8/18; H04W 8/265
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |

(Continued)

FOREIGN PATENT DOCUMENTS

| | | |
|---|---|---|
| EP | 2 306 692 A1 | 4/2011 |
| JP | 2000-163031 A | 6/2000 |

(Continued)

OTHER PUBLICATIONS

Final Office Action dated Aug. 3, 2016, for U.S. Appl. No. 14/474,716, filed Sep. 2, 2014, 17 pages.
(Continued)

*Primary Examiner* — Nader Bolourchi
(74) *Attorney, Agent, or Firm* — Morrison & Foerster LLP (57) ABSTRACT

A method of establishing communications with a first device is disclosed. The method includes: the first device presenting connection information to a second device; receiving a response from a second device; establishing an association with the second device; transmitting, in response to a determination that the first device and the second device are connected for data, first data to the second device, the first data comprising addressing information for a server; receiving second data from the second device, the second data comprising second information for establishing communications with the first device; and configuring the first device to receive third data from a location remote to the first device using the second information from the second data.

25 Claims, 4 Drawing Sheets

(51) Int. Cl.
*G06K 7/14* (2006.01)
*H04W 12/04* (2009.01)
*H04W 8/18* (2009.01)
*H04W 8/00* (2009.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,660,565 | B2 | 2/2010 | Patel et al. |
| 7,663,607 | B2 | 2/2010 | Hotelling et al. |
| 8,254,572 | B2 | 8/2012 | Vaughan et al. |
| 8,342,407 | B2 | 1/2013 | Williams et al. |
| 8,358,596 | B2 | 1/2013 | Byrne et al. |
| 8,405,729 | B2 | 3/2013 | Jain |
| 8,438,288 | B2 | 5/2013 | Garcia Jurado Suarez et al. |
| 8,479,122 | B2 | 7/2013 | Hotelling et al. |
| 2005/0039005 | A1* | 2/2005 | Dyck .................. H04L 63/08 713/168 |
| 2006/0121894 | A1 | 6/2006 | Ganesan |
| 2006/0197753 | A1 | 9/2006 | Hotelling |
| 2014/0181172 | A1 | 6/2014 | Elliott |
| 2016/0057609 | A1* | 2/2016 | Nebel .................. H04W 28/08 709/201 |

FOREIGN PATENT DOCUMENTS

JP 2002-342033 A 11/2002
WO WO-2013/012401 A1 1/2013

OTHER PUBLICATIONS

Lee, S.K. et al., (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Dec. 17, 2015, for U.S. Appl. No. 14/474,716, filed Sep. 2, 2014, 17 pages.

Notice of Allowance dated Jan. 23, 2017, for U.S. Appl. No. 14/474,716, filed Sep. 2, 2014, eleven pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

METHOD OF ESTABLISHING COMMUNICATIONS

CROSS REFERENCES TO RELATED APPLICATIONS

This application is a continuation of U.S. patent application Ser. No. 14/474,716, filed Sep. 2, 2014 and published on Mar. 3, 2016 as U.S. Patent Publication No. 2016-0066178, the contents of which are incorporated herein by reference in their entirety for all purposes.

FIELD

This relates generally to methods and systems for activating a device, and more particularly, to using a second device to activate a first device.

BACKGROUND

A new (or freshly-restored) electronic device usually needs to be activated before it can be used. The activation process can typically involve, for example, initializing some basic settings (e.g., date/time, language), security (e.g., username, password), and/or other system and network settings (e.g., phone number, network account) associated with the device. Some devices (e.g., smartphones) require a network connection for at least part of the activation process to, for example, register with and receive confirmation from a network server and/or download data from a network. However, the activation process can be a challenge for devices restricted by their limited network capabilities and other limitations.

SUMMARY

This generally relates to activating an electronic device using another electronic device. In the embodiments discussed below, the device being activated can be referred to as the first device and the device assisting with the activation of the first device can be referred to as the second device. The first device can have limited network capability and/or restricted by its form factor, which can make it difficult for it to perform a self-activation. The first device can be paired with the second device. A secure channel can be established between the paired devices to allow the first device to pass data to the second device. The second device can, in turn, serve as a proxy to make the activation request on behalf of the first device and return the necessary information to the first device to complete the activation process.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This generally relates to activating an electronic device using another electronic device. In the embodiments discussed below, the device being activated can be referred to as the first device and the device assisting with the activation of the first device can be referred to as the second device. The first device can have limited network capability and/or restricted by its form factor, which can make it difficult for it to perform a self-activation. The first device can be paired with the second device. A secure channel can be established between the paired devices to allow the first device to pass data to the second device. The second device can, in turn, serve as a proxy to make the activation request on behalf of the first device and return the necessary information to the first device to complete the activation process.

Figure 1:
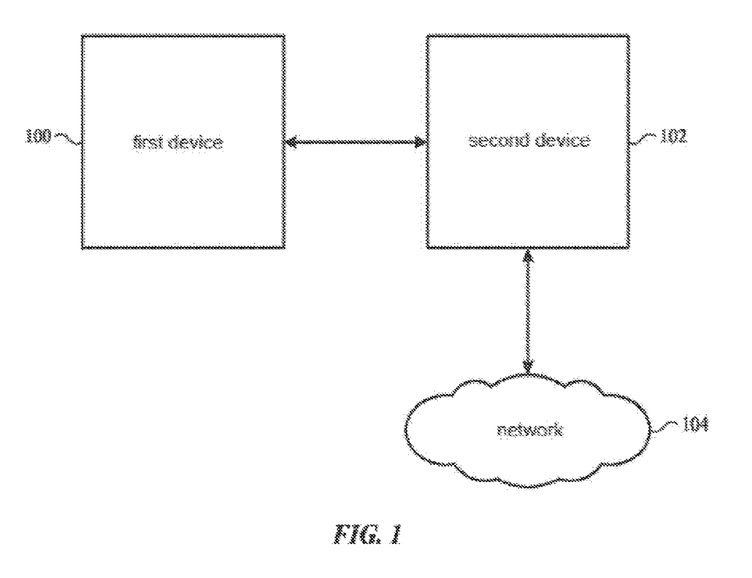
FIG. 1 is a block diagram illustrating an exemplary network including a first device and a second device, according to an embodiment of the disclosure.

FIG. 1 illustrates an exemplary network including the first and second devices 100, 102. The first device 100 can be any electronic device including, but not limited to, a tablet PC, smartphone, cellular phone, digital media player, electronic reader, electronic wearable device, smart TV, video game console, a personal computer (PC), and Mac. In some embodiments, the first device 100 can have limited network capability, at least before it is activated. For example, the first device 100 may not be able to connect to a cellular or Wi-Fi network and can be limited to having only short distance wireless connections such as a Bluetooth connection. The cellular or Wi-Fi capabilities can be unavailable before the activation process is completed. Additionally or alternatively, in some embodiments, the first device 100 can be limited by its form factor. For example, the first device 100 may not include a virtual or physical keypad that allows a user to enter input such as a Wi-Fi password to establish a Wi-Fi connection. As such, the first device 100 may not be able to perform one or more steps of the activation process (e.g., a step that requires a Wi-Fi connection to a network server) on its own.

In the embodiments described below, the first device 100 can use the second device 102 as its proxy to solve this problem. More specifically, the second device 102 can perform a number of steps including, for example, making the activation request to a network server 104 on behalf of the first device 100 and forwarding a confirmation and other information from the network server 104 to the first device 100.

The second device 102 can also be any electronic device including, but not limited to, a tablet PC, smartphone, cellular phone, digital media player, electronic reader, electronic wearable device, smart TV, video game console, a personal computer (PC), and Mac. Preferably, unlike the first device 100, the second device 102 can be network enabled to connect to, for example, a Wi-Fi or cellular network to communicate with other devices (e.g., network server 104)

on the same network. Accordingly, the second device 102 can perform its own activation without assistance from another device. The second device 102 can additionally have short distance network capability such as Bluetooth that allows it to communicate with the first device 100, as will be detailed below. In addition, the second device can include common I/O devices such as a camera, scanner, microphone, and/or display for interfacing with a user and/or another device.

Referring back to FIG. 1, the second device can be connected to a network server 104 via a network. The network can be any type of computer network including, but not limited to, a local area network (LAN), wide area network (WAN), the Internet, Wi-Fi network, and cellular network. The network server 104 can be a cloud server or any other types of computer servers. In this embodiment, the first device may not be able to connect to the network server 104 directly when it has not been activated yet.

Figure 2:
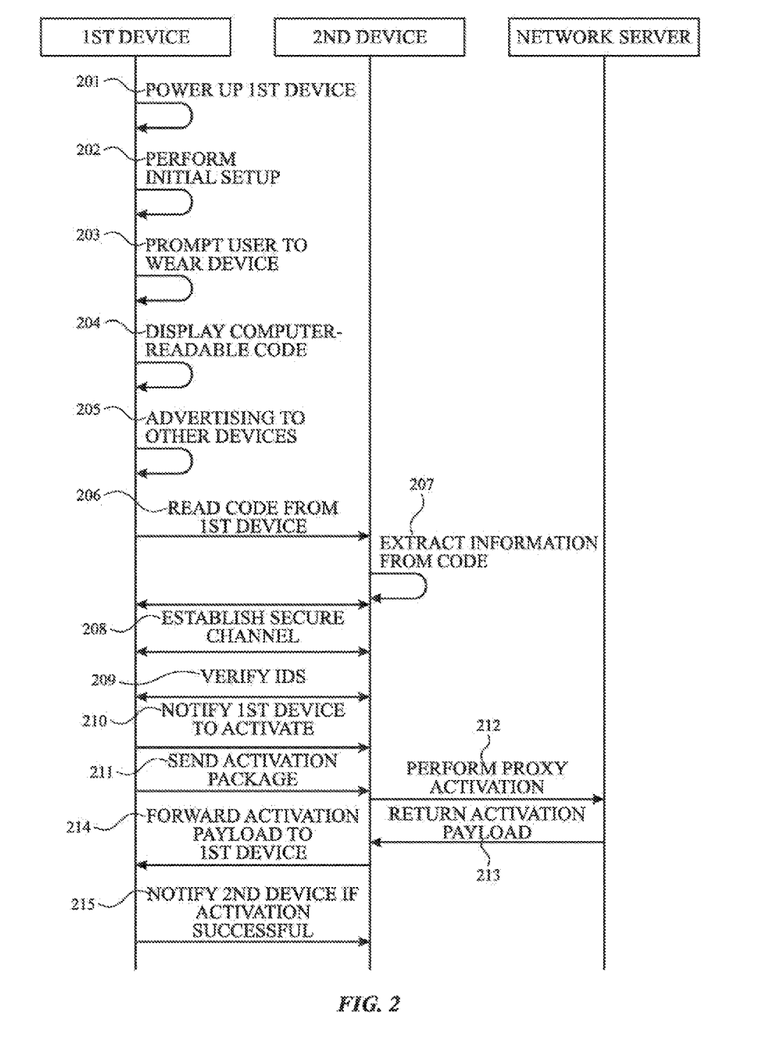
FIG. 2 is a flowchart illustrating exemplary steps of activating a first device using a second device as a proxy, according to an embodiment of the disclosure.

FIG. 2 is a flowchart illustrating the exemplary steps in a method of activating the first device 100, according to an embodiment of the disclosure. In this embodiment, the second device 102 can serve as a proxy for the first device 100 by passing the required information back and forth between the first device 100 and the network server 104.

As illustrated in FIG. 2, the activation process can start by powering up the first device (step 201). In one embodiment, a welcome screen can be shown followed by one or more screens that allow one or more local setup steps (e.g., selecting a language) to be performed (step 202). If the first device is a wearable device, the first device can determine if it is being worn by the user. This can be done using one or more sensors (e.g., a touch, proximity sensor, a heart rate sensor, or other biological sensor) built in the first device. If it is determined that the first device is not being worn by the user, the first device can display a message asking the user to put on the device to continue the activation process (step 203). This step can be optional if the device is already being worn by the user or if the device is not a wearable device. In some embodiments, this step can be optional regardless of whether the device is a wearable device or not.

In this embodiment, because of its limited network capability, the first device may not be able to connect to the network directly. Accordingly, the first device can be required to connect to a proxy device such as the second device to continue the activation process.

For example, the first device can launch an application (e.g., a mobile app) to display a computer-readable code (e.g., a Quick Response (QR) code or bar code) on its display (step 204). Specific examples of computer-readable code are disclosed in U.S. patent application Ser. No. 14/339,754, which is hereby incorporated by reference in its entirely. In some implementations, the computer readable code is not visible or is difficult to be seen by the human eye. The computer-readable code can encode information that can be used in the activation process. For example, the computer-readable code can include a device ID for identifying the first device to another device (e.g., the second device). In addition, the computer-readable code can include a Bluetooth out-of-band ID (or other similar information) for establishing a communication channel between the first device and the second device.

In this embodiment, when the computer-readable code is displayed on the first device, the first device can start advertising itself to other devices using, for example, the Bluetooth LE standard advertising protocol (step 205). The first device can remain in this state until a response from another device (e.g., the second device) is received. Alternatively, the advertising can end after a predetermined period of time.

To initiate the pairing process, the second device can, for example, scan the computer-readable code displayed on the first device (step 206). In one embodiment, a code-scanning app can be launched on the second device. The app can turn on the camera on the second device and use the camera to scan the code (e.g., a QR code) displayed on the first device. The second device can then use the app to extract the information such as the device ID and the Bluetooth out-of-band key from the code (step 207).

In other embodiments, different mechanisms can be used to pass the same information from the first device to the second device. For example, in one embodiment, the information can be encoded in, for example, an audio clip, that can be captured by a microphone on the second device. In another embodiment, a user can tap the two devices together to transfer the information. It should be understood that the disclosure is not limited to the mechanisms mentioned in this document and that any suitable means can be used for passing information between the two devices in order to pair the devices.

In one embodiment, the pairing process can include the first and second devices performing a "handshake" to make sure that the devices are connectible. Once it is determined that they can connect, the devices can be connected using, for example, the Bluetooth out-of-band key (e.g., a 16-byte key) extracted from the computer-readable code. The key can define the first device as a re-connectable device to the second device and be plugged in on both devices to pair the devices. If successful, a Bluetooth secure channel can be brought up (step 208). With the secure channel in place, the devices can verify if their identity services (IDS) are running normally (step 209). The IDS can include a queue for storing forward messages between the two devices and, thus, be used as a messaging system for facilitating communications between the first and second devices. Part of bringing up the IDS can also include checking whether both devices are valid to make sure that not only that there can be a secure connection between them, but that the devices themselves are trusted devices. In one embodiment, a device can be deemed a trusted device if it runs the same OS or is on the same platform with respect to the other device.

After the second device determines that the pairing with the first device is successful and the devices are connected for data, the second device can notify the first device to activate using the IDS channel that has been brought up (step 210). This communication can be transmitted via the secure channel within the IDS. Although a secure channel within IDS is described as the communication channel between the two devices in this embodiment, it should be understood that other suitable communication channels/services can also be used for performing the same tasks.

Then, the first device can put together a package of activation data, which can include, for example, the device type, serial number, and unique ID associated with the first device along with a network address such as a uniform resource locator (URL) that identifies the location of a network server. The first device can send the package to the second device via the secure channel (step 212). After receiving the activation package from the first device, the second device can connect to the network server based on the network address and perform a proxy activation at the network server (step 213). The network server can, in turn, send an activation payload back to the second device (step 214). The activation payload can include, for example, a confirmation that the first device is a valid device, updates for the first device's regulatory images, and one or more keys for digital rights management (DRM) security. The second device can pass this activation payload to the first device via the secured channel within the IDS (step 215). Using the information in the activation payload, the first device can complete the activation by, for example, updating its regulatory images, setting up its DRM security, and performing other necessary steps to put itself in an activated state. The first device can then notify the second device whether the activation is successful (step 216). If the activation is successful, the process is finished. If not, the first device can request the second device to display a message to inform the user that the activation has failed and provide an option for the user to try activating the first device again.

Because IDS can also be used by a messaging service on the devices, they can also leverage a high-level user account (e.g., an Apple ID) associated with the first device to provide additional and/or more advanced features on the first device. In one embodiment, the first device can receive a temporary account to identify itself when it is paired with the second device. Thereafter, the first device can ask the user to authorize the device using his high-level user account (e.g., Apple ID). When authorization is done, additional processes such as software opt-ins and data synchronization (e.g., copying or moving data from the second device and/or another remote location, e.g., a cloud storage, to the first device) can be performed. Additionally or alternatively, with the upgraded account, the first device can have direct Wi-Fi access and/or connect to a cloud server by using a push token associated with the account. Additionally or alternatively, storage space for the first device can be allocated on the second device or a remote server for backing up and storing data from the first device. The secure channel within the IDS can be preserved after the pairing stage to facilitate further communications between the two devices.

Although embodiment of FIG. 2 illustrates using one device (e.g., the second device) to activate another device (e.g., the first device), it should be understood that any suitable device within Bluetooth range of the first device can be used to activate the first device.

Figure 3:
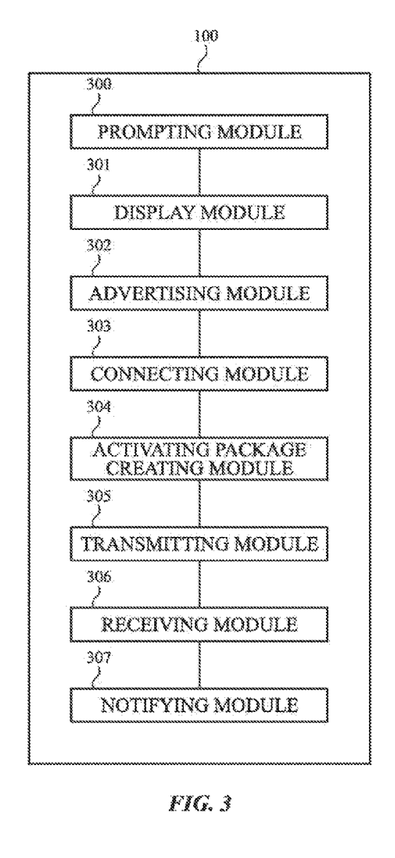
FIG. 3 is a block diagram illustrating the exemplary modules of a first device, according to an embodiment of the disclosure.

FIG. 3 is a block diagram illustrating the exemplary modules of the first device 100 of FIG. 1. The first device 100 can include, for example, a prompting module 301, display module 302, advertising module 303, connecting module 304, activation package creating module 305, transmitting module 306, receiving module 307, and notifying module 308. The prompting module 301 can prompt the user to wear the first device. Additionally or alternatively, the prompting module 301 can prompt the user to select some of the local settings (e.g., language) of the first device 100. The display module 301 can display a computer-readable code such as a QR code to be used for pairing the first device with another device. The advertising module 302 can advertise the first device to other devices in its vicinity (e.g., within the Bluetooth connection radius). The connecting module 303 can establish a connection (e.g., a secure channel within IDS) between the first device and the second device. The activation package creating module 304 can create an activation package including information that can be used by the second device to perform a proxy activation. The transmitting module 305 can transmit the activation package to the second device. The receiving module 306 can receive an activation payload from the second device. The notifying module 307 can notify the second device whether the activation process is a success. It should be understood that some of the modules illustrated in FIG. 3 can be optional and the first device 100 can include other modules not illustrated in FIG. 3.

Figure 4:
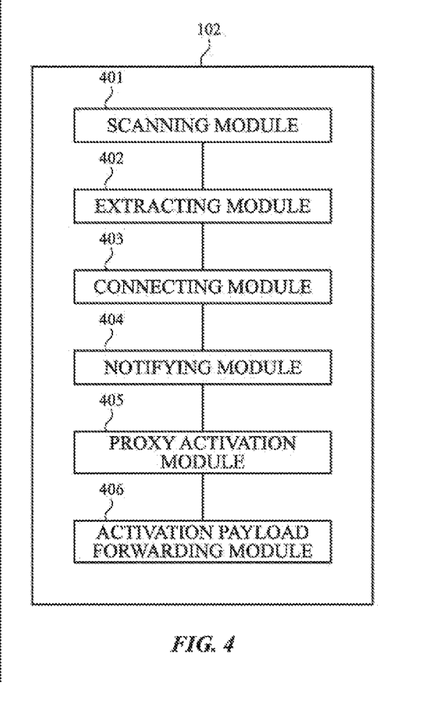
FIG. 4 is a block diagram illustrating the exemplary modules of a second device, according to an embodiment of the disclosure.

FIG. 4 is a block diagram illustrating the exemplary modules of the second device 102 of FIG. 1. The second device 102 can include, for example, a scanning module 401, extracting module 402, connecting module 403, notifying module 404, proxy activation module 405, and activation payload forwarding module 406. The scanning module 401 can scan the computer-readable code displayed on a device being activated (e.g., the first device). The extracting module 402 can extract information from the scanned computer-readable code. The connecting module 403 can establish a communication channel with the first device using information extracted from the scanned computer-readable code. The notifying module 404 can notify the first device (e.g., the first device) that a communication channel has been established for transmitting information required to complete the activation of the first device. The proxy activating module 405 can perform a proxy activation at a network server in response to a request from the first device. The activation payload forward module 406 can forward an activation payload received from the network server to the first device. It should be understood that some of the modules illustrated in FIG. 4 can be optional and the second device 102 can include other modules not illustrated in FIG. 4.

Figure 5:
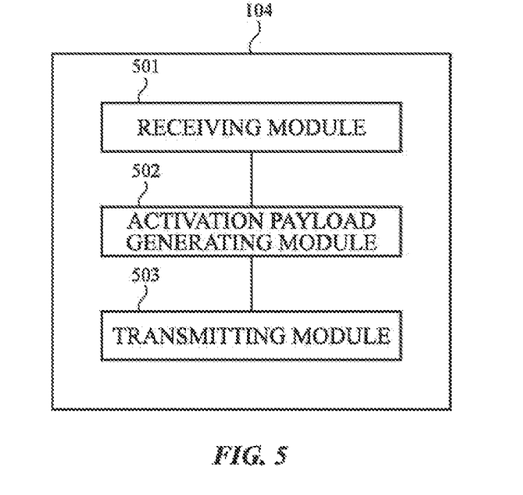
FIG. 5 is a block diagram illustrating the exemplary modules of the network server, according to an embodiment of the disclosure.

FIG. 5 is a block diagram illustrating the exemplary modules of the network server 104 of FIG. 1. The network server 104 can include a receiving module 501 configured to receive an activation request from a device on the network. The device can be a device to be activated or a device (e.g., the second device 102) serving as a proxy to the device (e.g., the first device 100) being activated. The network server 104 can also include an activation payload generating module 502 that can generate an activation payload to be used in activating a device and a transmitting module 503 that can transmit the activation payload to either the device being activated or the device serving as a proxy to the device being activated.

Each of the modules of FIGS. 3-5 can be implemented in software, hardware, or a combination of the two. In some embodiments, one or more of the modules of the first device 100, second device 102, and network server 104 can be implemented in software and stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 6:
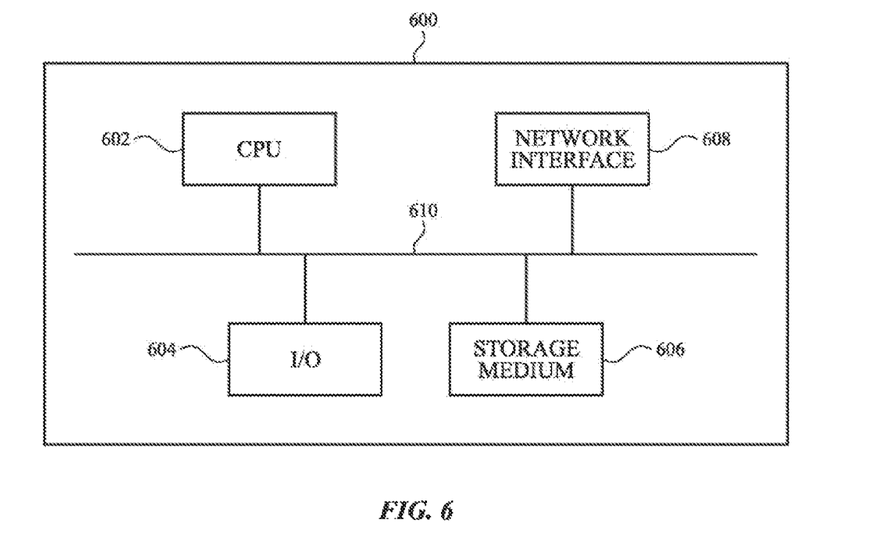
FIG. 6 illustrates exemplary components of a computing system such as the first device or second device described in the embodiments of the disclosure.

The non-transitory computer readable storage medium can be part of a computing system that can be the first device, second device, or network server in the above-described embodiments. FIG. 6 illustrates exemplary common components of one such computing system. As illustrated, the system 600 can include a central processing unit (CPU) 602, I/O components 604 including, but not limited to one or more of display, keypad, touch screen, speaker, and microphone, storage medium 606 such as the ones listed in the last paragraph, and network interface 608, all of which can be connected to each other via a system bus 610. The storage medium 606 can include the modules of FIGS. 3-5 depending on whether the system is the first device 100, second device 102, or network server 104.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method of establishing communications with a first device, the method comprising, at the first device:
   presenting connection information to a second device;
   receiving a response from the second device;
   establishing an association with the second device;
   transmitting, in response to a determination that the first device and the second device are connected for data, first data to the second device, the first data comprising addressing information for a server;
   receiving second data from the second device, the second data comprising information for establishing communications with the first device; and
   in response to receiving the second data from the second device configuring the first device to receive third data from a location remote to the first device using the information from the second data.

2. The method of claim 1, wherein establishing an association with the second device comprises:
   pairing with the second device; and
   establishing a communication channel with the second device.

3. The method of claim 1, wherein the first data comprises an information package.

4. The method of claim 1, wherein the second data comprises an information payload.

5. The method of claim 4, wherein the information payload comprises authentication information.

6. The method of claim 1, wherein the second device comprises the server.

7. The method of claim 1, wherein the location remote to the first device corresponds to the location of a cloud server.

8. The method of claim 1, wherein the location remote to the first device corresponds to the location of the second device.

9. The method of claim 1, wherein the first device and the second device are connected to a network, and the remote location corresponds to the location of a third device connected to the network.

10. The method of claim 1, wherein the second device comprises a network gateway.

11. The method of claim 1, wherein the second device is one of a tablet PC, a smartphone, a cellular phone, a digital media player, an electronic reader, an electronic wearable device, a smart TV, a video game console, a desktop computer, and a laptop computer.

12. The method of claim 1, wherein receiving data from a location remote to the first device comprises synchronizing data between the first device and the location remote to the first device.

13. A method of establishing communications with a first device, the method comprising, at a second device:
   receiving connection information from the first device;
   sending a response to the first device;
   establishing an association with the first device;
   receiving, in response to a determination that the first device and the second device are connected for data, first data from the first device, the first data comprising addressing information for a server;
   connecting to the server using the first data;
   sending second data to the first device, the second data comprising information for establishing communications with the first device; and
   in response to the first device establishing communications with a location remote to the first device using the information from the second data, sending third data to the first device.

14. The method of claim 13, wherein establishing an association with the first device comprises:
   pairing with the first device; and
   establishing a communication channel with the first device.

15. The method of claim 13, wherein the second device comprises the server.

16. The method of claim 13, wherein the second device comprises a network gateway.

17. The method of claim 13, wherein the location remote to the first device corresponds to the location of the second device.

18. A non-transitory computer-readable storage medium storing instructions which, when executed by a processor of a first device, perform a method comprising, at the first device:
   presenting connection information to a second device;
   receiving a response from the second device;
   establishing an association with the second device;
   transmitting, in response to a determination that the first device and the second device are connected for data, first data to the second device, the first data comprising addressing information for a server;
   receiving second data from the second device, the second data comprising information for establishing communications with the first device; and
   in response to receiving the second data from the second device configuring the first device to receive third data from a location remote to the first device using the information from the second data.

19. The non-transitory computer-readable storage medium of claim 18, wherein establishing an association with the second device comprises:
   pairing with the second device; and
   establishing a communication channel with the second device.

20. The non-transitory computer-readable storage medium of claim 18, wherein the second data comprises an information payload comprising authentication information.

21. The non-transitory computer-readable storage medium of claim 18, wherein the second device comprises the server.

22. The non-transitory computer-readable storage medium of claim 18, wherein the location remote to the first device corresponds to the location of a cloud server.

23. The non-transitory computer-readable storage medium of claim 18, wherein the location remote to the first device corresponds to the location of the second device.

24. The non-transitory computer-readable storage medium of claim 18, wherein the first device and the second device are connected to a network, and the remote location corresponds to the location of a third device connected to the network.

25. The non-transitory computer-readable storage medium of claim 18, wherein the second device is one of a tablet PC, a smartphone, a cellular phone, a digital media player, an electronic reader, an electronic wearable device, a smart TV, a video game console, a desktop computer, and a laptop computer.

* * * * *

UNITED STATES PATENT AND TRADEMARK OFFICE
CERTIFICATE OF CORRECTION

PATENT NO. : 9,900,767 B2
APPLICATION NO. : 15/599088
DATED : February 20, 2018
INVENTOR(S) : Tyler Hawkins Page 1 of 1

It is certified that error appears in the above-identified patent and that said Letters Patent is hereby corrected as shown below:

At Column 8, Claim 18, Line numbers 49-50, please delete "in response to receiving the second data from the second device".

Signed and Sealed this
Twenty-eighth Day of August, 2018

Andrei Iancu
*Director of the United States Patent and Trademark Office*